United States Patent
Denteneer et al.

(10) Patent No.: US 8,737,264 B2
(45) Date of Patent: May 27, 2014

(54) PROXY MECHANISM FOR MESH-TYPE NETWORKS

(75) Inventors: Theodorus Jacobus Johannes Denteneer, Eindhoven (NL); Guido Roland Hiertz, Aachen (DE); Bernhard Walke, Wuerselen (DE)

(73) Assignee: Koninklijke Philips N.V., Eindhoven (NL)

( * ) Notice: Subject to any disclaimer, the term of this patent is extended or adjusted under 35 U.S.C. 154(b) by 193 days.

(21) Appl. No.: 13/060,293

(22) PCT Filed: Aug. 27, 2009

(86) PCT No.: PCT/IB2009/053751
§ 371 (c)(1),
(2), (4) Date: Feb. 23, 2011

(87) PCT Pub. No.: WO2010/026512
PCT Pub. Date: Mar. 11, 2010

(65) Prior Publication Data
US 2011/0149804 A1 Jun. 23, 2011

(30) Foreign Application Priority Data
Sep. 2, 2008 (EP) .................................... 08163484

(51) Int. Cl.
*H04L 12/28* (2006.01)
(52) U.S. Cl.
USPC .......................................... 370/254; 709/226
(58) Field of Classification Search
USPC ................... 370/254, 242; 709/226
See application file for complete search history.

(56) References Cited

U.S. PATENT DOCUMENTS

| 2004/0233891 | A1* | 11/2004 | Regan et al. ................... 370/351 |
| 2006/0193285 | A1 | 8/2006 | Roy et al. |
| 2007/0189247 | A1 | 8/2007 | Wang et al. |
| 2007/0211736 | A1 | 9/2007 | Sapek et al. |
| 2008/0279133 | A1* | 11/2008 | Bienfait et al. ............... 370/315 |
| 2009/0290537 | A1* | 11/2009 | Berglund et al. .............. 370/328 |
| 2010/0220643 | A1* | 9/2010 | Qi et al. ......................... 370/312 |

FOREIGN PATENT DOCUMENTS

WO 2007106266 A1 9/2007

OTHER PUBLICATIONS

Garrappo et al: "Notes on Implementing a IEEE 802.11 Mesh Point"; Wireless and Mobility 2008, LNCS 5122, pp. 60-72.
Bahr et al: "Joint See-Mesh/Wi-Mesh Proposal to 802.11 TGs"; IEEE 802.11-06/0328R0, Feb. 2006, pp. 1-165.
Bahr, M.: "Proposed Routing for IEEE 802.11s WLAN Mesh Networks"; WICON'06, 2nd Annual International Wireless Internet Conference, Aug. 2006, 10 Page Document.
Nortel: "Wireless Mesh Network: Outdoor Wi-Fi Made Simple"; Product Information Document, Retrieved From www.nortel.com, 2008, 8 Page Document.

(Continued)

*Primary Examiner* — Wei Zhao

(57) ABSTRACT

The present invention is directed to an apparatus and method for connecting a mesh type network via an access device to another network, wherein a proxy mechanism is provided in the mesh type network, that allows for interconnection and range extension of legacy access point based mesh type networks. Thereby, interconnection and range extension of e.g. legacy AP-based WLANs or similar types of networks can be achieved. Moreover, the proposed proxy mechanism does not require any changes or modifications to the access device(s) (e.g. AP) and works with any type of access device.

7 Claims, 6 Drawing Sheets

| FC | D / ID | A1 | A2 | A3 | SC | A4 | B | FCS |

(56) References Cited

OTHER PUBLICATIONS

IEEE Computer Society: "IEEE Standard for Information Technology—Telecommunications and Information Exchange Between Systems—Local and Metropolitan Area Networks Specific Requirements, Part 11: Wireless LAN Medium Access Control (MAC) and Physical Layer (PHY) Specifications", IEEE STD 802.11, Jun. 2007, 9 Page Document.

* cited by examiner

| FC | D / ID | A1 | A2 | A3 | SC | A4 | B | FCS |
Fig. 1
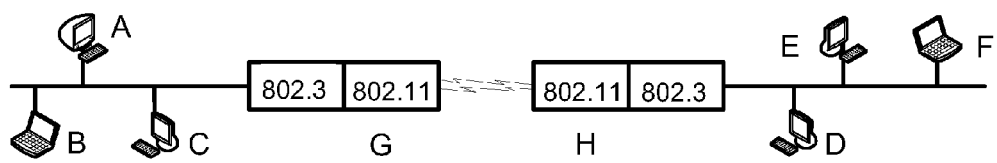
Fig. 2
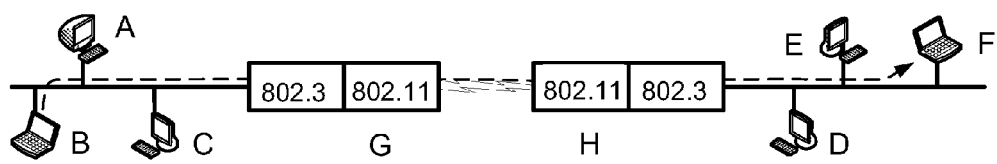
Fig. 3

| FC | D / ID | A1 | A2 | A3 | SC | B | FCS |

PROXY MECHANISM FOR MESH-TYPE NETWORKS

FIELD OF THE INVENTION

The present invention generally relates to an apparatus, a method, a computer program product and a system for connecting a mesh type network via an access device to another network.

BACKGROUND OF THE INVENTION

In WLAN deployments without mesh services, client stations or end stations (STAs) must associate with an access point (AP) in order to gain access to the network. These STAs are dependent on the AP with which they are associated to communicate.

IEEE (Institute of Electrical and Electronics Engineers) standard 802.11s develops a wireless local area network (WLAN) mesh standard. With wireless mesh networks (WMNs) devices can easily interconnect. Each device works as a wireless router that forwards frames for other devices. Thus, networks can be easily deployed without an additional fixed infrastructure.

A so-called mesh network appears functionally equivalent to a broadcast Ethernet from the perspective of other networks and higher layer protocols. As an example, the mesh network may be an LAN according to the IEEE 802.11 specifications, where links and control elements forward frames among the network members. Thus, it normally appears as if all mesh points (MPs) in a mesh are directly connected at the link layer. This functionality is transparent to higher layer protocols.

A standard 'infrastructure' wireless local area network is a centralized network in which STAs attach to the AP which acts as a 'master station'. This centralized topology makes network formation and initial channel selection easy. The AP is configured to start transmitting at a certain frequency channel and the STAs only need to find this channel e.g. by scanning a list of available frequencies. They can do so actively, by broadcasting probe requests on each visited channel, or passively, by listening for advertisements or beacons on each visited channel. After having visited all available channels, they will have found all APs that are in the vicinity, and can select one to associate with.

In many households, a digital subscriber line (DSL) provides high-speed Internet access. Due to economies of scale and strong competition, DSL modems often provide a rich set of features at an affordable price. They do not only integrate an Internet Protocol (IP) router but may furthermore work as print and file server and connect wireless clients via 802.11 links. Accordingly, 802.11 networks have a high penetration rate in the home. Furthermore, APs have become a commodity and can be found nearly everywhere.

Due to the current 802.11 design, the central AP manages the whole WLAN. However, APs typically do not interconnect. Each WLAN established by an AP is an independent network. For large scale coverage, APs require wired backbones that interconnect them. With WMN technology, devices can interconnect over the air. Each device becomes a wireless router that provides the frame forwarding service for other devices. To be able to operate as wireless router, a device needs special capabilities or software modules. However, many existing APs cannot be upgraded. Either the device's manufacturer considers a product to be end of life and thus product maintenance has ended or, the device's hardware limits possible implementations. Thus, a generic solution is needed that connects a WMN with one or more existing APs and thus provides the WMN with the AP's Internet connectivity.

FIG. 1 shows a mesh data frame structure according to the IEEE 802.11 specifications. A frame control (FC) field contains amongst other control information a type and subtype for the mesh data frame and two flags "To DS" and "From DS". The two flags are set to "1" in order to indicate that the data frame is in the wireless distribution system and therefore in the mesh network. Additionally, address fields A1 to A4 are provided to convey and indicate destination, source, transmitter and receiver addresses. The four address fields contain 48-bit long MAC (Media Access Control) addresses. The first address field A1 indicates a receiver address which defines the mesh point that has to receive the wireless transmission. The second address field A2 indicates a transmitter address which defines the mesh point that sent this wireless data frame. The third address field A3 indicates a destination address which defines the final (layer 2 or link layer) destination of this data frame. The fourth address field A4 indicates a source address which defines the (layer 2 or link layer) source of this data frame.

Furthermore, duration/identity (D/ID), sequence control (SC) and frame check sequence (FCS) fields are provided, which are not discussed here for brevity and simplicity reasons. Further details can be gathered from the IEEE 802.11 specifications. A body (B) portion is provided to convey desired payload data up to a length of 2304 octets.

Each of the above addresses may have a length of 6 octets and maps on the address fields A1 to A4 in dependence on the "To DS" and "From DS" information of the FC field. The IEEE 802.11 standard clearly states that an address field is omitted "where the content of a field is shown as not applicable (N/A)." Solely when both bits "To DS" and "From DS" are set to "1", four address fields appear in an 802.11 frame.

FIG. 2 shows a schematic network architecture, where the four address fields A1 to A4 are used to interconnect to different IEEE 802.3 network segments with the help of a wireless network (e.g. an IEEE 802.11 WLAN) comprising devices G and H. Here, the wireless network is used to provide a bridge between a first independent wired LAN comprising devices A to C and a second independent wired LAN comprising devices D to F.

APs form infrastructure basic service sets (BSSs). In a BSS, the AP relays all traffic. Although the IEEE 802.11 standard provides four address fields, only three address fields A1 to A3 are typically needed in an infrastructure BSS.

FIG. 3 shows a signaling example based on the network architecture of FIG. 2, wherein device B sends a frame destined to device F. In this case, four address fields are needed on the wireless link between devices G and H. The fourth address field A4 corresponds to a source address (SA) field that holds device B's address. The third address field A3 corresponds to a transmitter address (TA) field that holds device G's address. The first address field A1 corresponds to a receiver address (RA) field that holds device H's address. The second address field A2 corresponds to a destination address (DA) field that holds device F's address. Once device H has successfully received the 802.11 frame from device G, it strips off the data portion in the 802.11 body and sends out the data portion in an 802.3 frame that solely contains device B's address as source address and device's F address as destination address.

However, most of the current 802.11 APs, however, cannot operate in this bridging mode as described above. They solely serve as AP in their local infrastructure BSS.

FIG. 4 shows an exemplary conventional network architecture, where a single device C works as AP, router and modem that connects a WLAN with an external network 100, e.g. the Internet. Client devices A and B have associated with the AP C. The devices A and B may exchange data via the AP C or access the external network 100. In any case, the devices A, B and, C use three address fields only. The client devices A and B set the "To DS" bit to "1" and the "From DS" bit to "0" when sending a frame to the AP C. If the device B sends a frame to the device A, the first address field A1 contains the AP's address as the receiver address (RA). The second address field A2 contains the source's address. Here, the source address is device B's address. The third address field A3 contains the ultimate destination's address. Here, the destination address (DA) equals device A's address. In case device B wants to communicate with an Internet station, the DA address holds the AP's address since device C works as an IP router or default gateway.

Once AP C has received device B's frame, it analyzes the third address field for the destination address. If destined to AP C, the frame is send to a higher layer where the IP router operates. If destined to device A, AP C relays the frame. Thus, AP C sends a frame to device A that has the "From DS" bit set to one and the "To DS" bit set to zero. The frame's address field 1 contains the Receiver Address (RA). In this case, it contains device A's address. The second address field contains the Transmitter Address (TA) that is AP C's address. The third address field contains the Source Address (SA), which equals device B's address.

FIG. 5 shows a correspondingly reduced 802.11 mesh data frame structure with only three address fields A1 to A3, sufficient for all of the aforementioned frames in an infrastructure BSS that uses three address fields only.

With APs that can handle three addresses only, the local BSS is limited to a single wireless hop. FIG. 6 shows an exemplary conventional network structure, where a device A connects with an AP C and a WMN. The device A can use any service of the AP C's infrastructure BSS. However, the device A cannot provide its network connectivity to the WMN. Although the device A and other devices D to G form a single WMN, the addressing limitation at the AP C prevents the device A from sharing its connectivity.

Since the AP C allows for the usage of three addresses only, all frames transmitted to the WMN must be destined to the device A. Without further information however, the device A cannot decide about a frame's final destination. Thus, the device A cannot forward frames to another destination in the WMN.

SUMMARY OF THE INVENTION

It is an object of the present invention to provide a more flexible approach which allows for interconnection and range extension of legacy networks. This object is achieved by an apparatus as claimed in claim 1 and a method as claimed in claim 6, and by a computer program product as claimed in claim 9.

Accordingly, a sort of proxy mechanism is provided, that allows to integrate a legacy network with a WMN. Thereby, interconnection and range extension of e.g. legacy AP-based WLANs or similar types of networks can be achieved. Moreover, the proposed proxy mechanism does not require any changes or modifications to the access device(s) (e.g. AP). It works with any type of access device.

The proposed apparatuses may be implemented as processor devices, modules, chips, chip sets or circuitries provided in a network node or station. A processor may be controlled by a computer program product comprising code means for performing the steps of the claimed methods when run on a computer or processor device.

According to a first aspect, at least one virtual radio station can be provided, wherein the radio access controller may be adapted to deliver a signal received from said access device to an addressed virtual device. Since a communication with virtual stations is established, the correct destination address can be easily detected.

According to a second aspect which can be combined with the above first aspect, the radio access controller may be adapted to serialize transmission requests if multiple entities try to transmit simultaneously. Thereby, multiple entities can transmit at the same time.

According to a third aspect which can be combined with any one or both of the above first and second aspects, at least one wireless access network interface card may be comprised for providing a connection to the access device, wherein the radio access controller may be adapted to interconnect the wireless network interface card and logical entities of the apparatus so as to establish the individual connections. This measure allows to maintain several independent connections at a time.

According to a fourth aspect which can be combined with the third aspect, at least one wireless access network interface card may share at least one of the physical layer and link layer channels. This measure saves processing resources.

Further advantageous developments are defined in the dependent claims.

BRIEF DESCRIPTION OF THE DRAWINGS

The present invention will now be described based on various embodiments with reference to the accompanying drawings in which:

FIG. 1 shows a mesh data frame structure with four address fields;

FIG. 2 shows a schematic network architecture where four address fields are used for interconnection;

FIG. 3 shows a signaling example based on the network architecture of FIG. 2;

DETAILED DESCRIPTION OF EMBODIMENTS

Figures 4, 5:
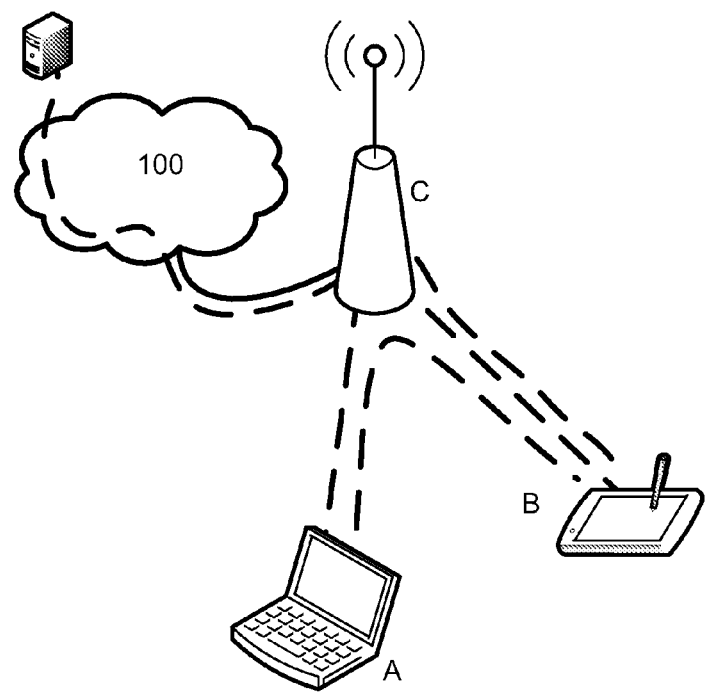
FIG. 4 shows an exemplary conventional network architecture, where a single device works as AP, router and modem.
FIG. 5 shows a reduced mesh data frame structure.
Figure 6:
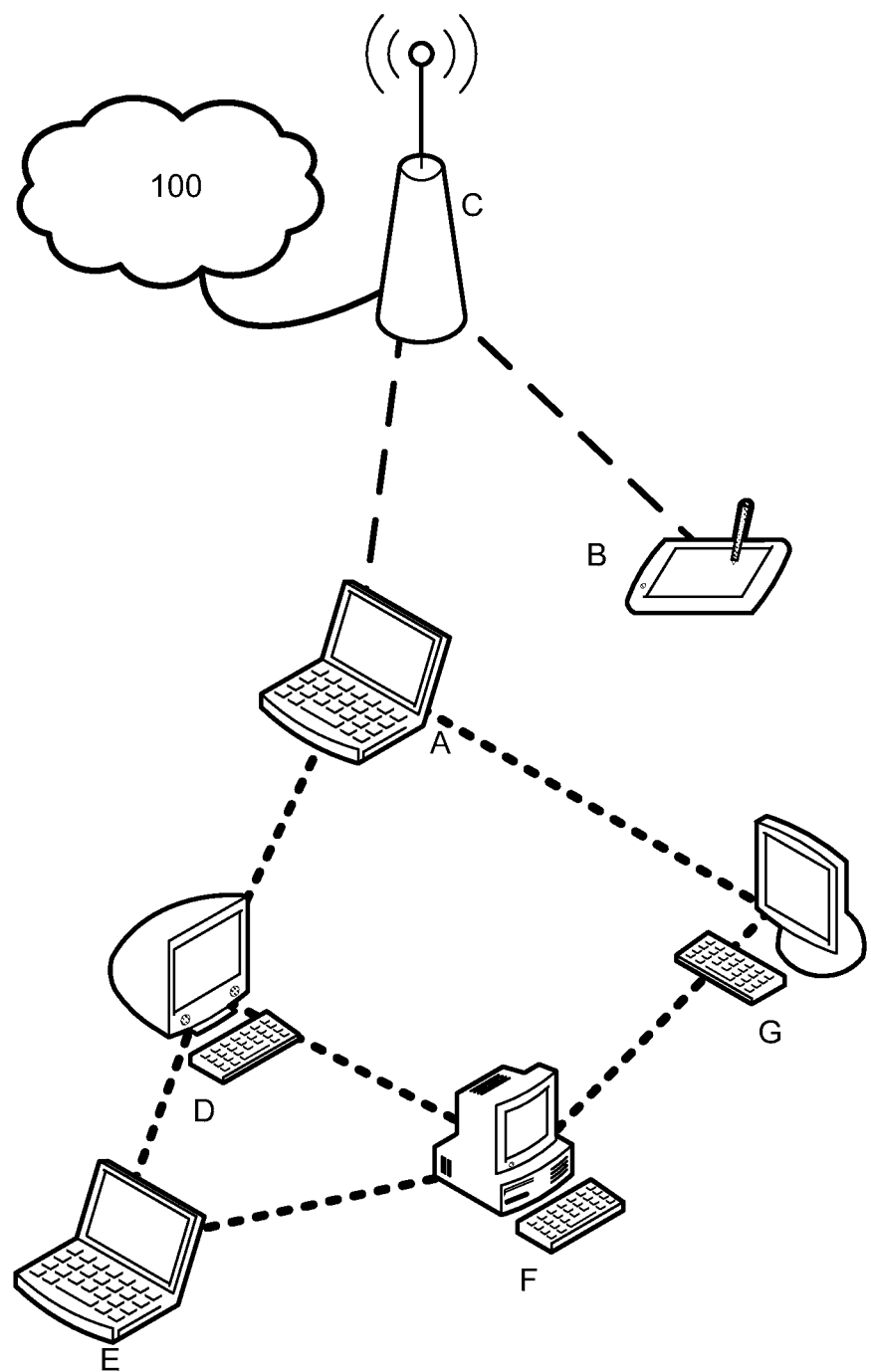
FIG. 6 shows an exemplary network structure, where a single device connects with an AP and a mesh network.
Figure 7:
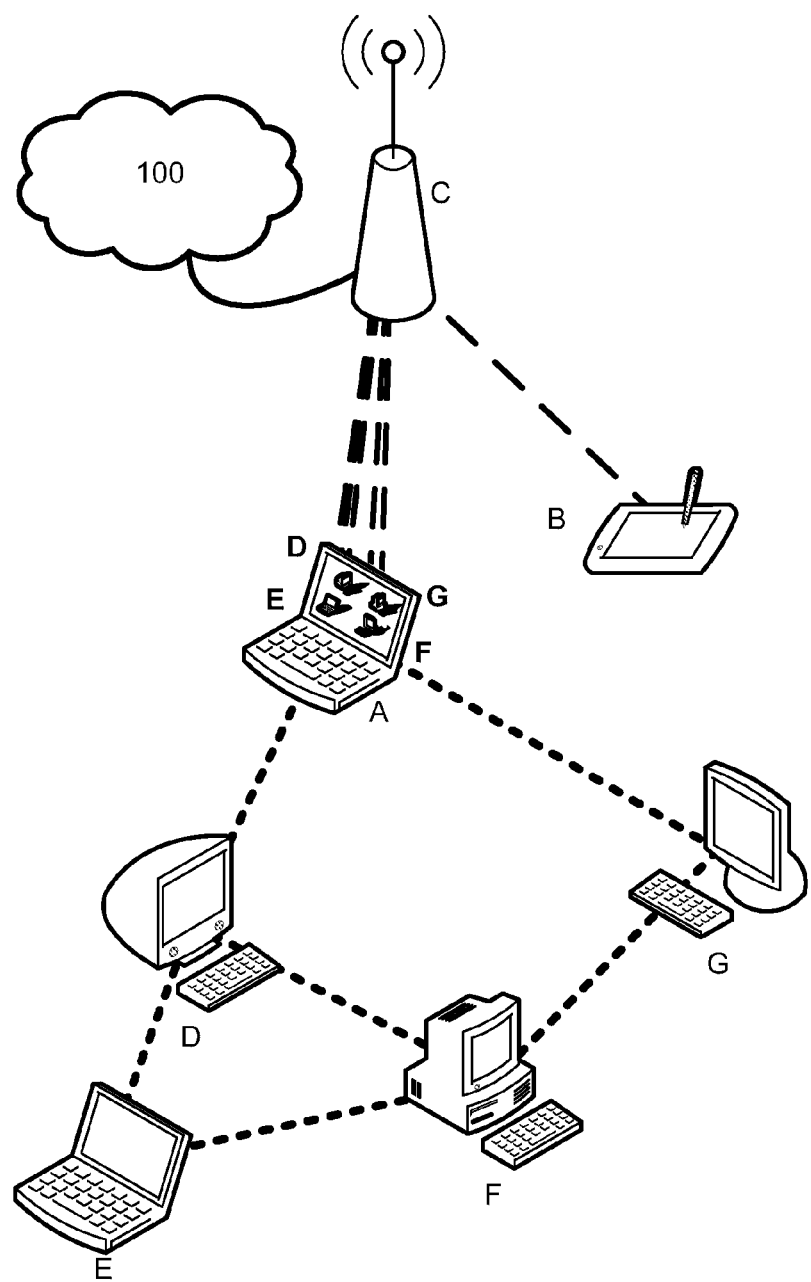
FIG. 7 shows an exemplary network structure, where a single device behaves as a proxy in accordance with embodiments of the present invention.

In the following, embodiments of the present invention are described on the basis of an exemplary wireless mesh network topology as shown in FIG. 7.

End-user devices (such as end stations (STAs)) A, B and D to G can benefit from the ability to establish interoperable peer-to-peer wireless links with neighboring end-user devices and an AP C in a mesh network. Mesh points (MPs) can be quality of service (QoS) STAs that support mesh services, i.e. they participate in interoperable formation and operation of the mesh network. An MP may be collocated with one or more other entities (e.g., AP, portal, etc.). The STAs A and B can associate with the AP C to gain access to an external network, e.g. the Internet. T.

According to a first embodiment, a proxy mechanism or functionality is provided, where a device that connects with both the WMN and a legacy access device, AP, or BSS operates on behalf of all devices that are present in the WMN.

FIG. 7 shows an exemplary network structure, where a single device behaves as a proxy in accordance with embodiments of the present invention. More specifically, device A behaves as a proxy for devices D to G. For AP C, all frame exchanges appear to occur locally. The AP C considers devices D to G to be one hop away, as device A is configured to maintain a separate connection with the AP C for each of the member of the WMN. Thus, device A virtually implements device E to G as well. For the AP C, all traffic appears to be local. Thus, the AP C treats the devices E to G as part of its BSS.

Figure 8:
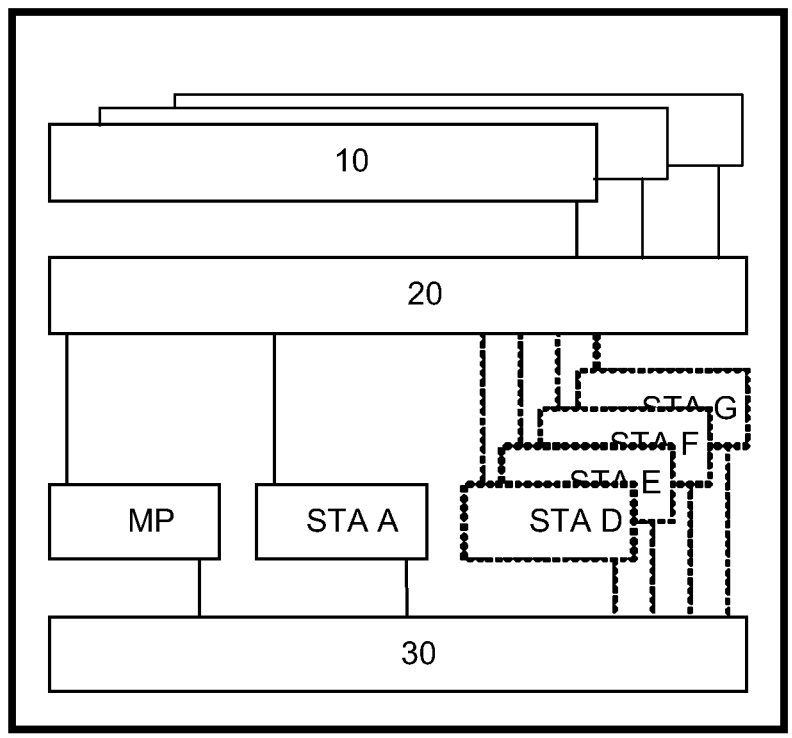
FIG. 8 shows a schematic block diagram of a device according to a first embodiment.

FIG. 8 shows a schematic block diagram of a device (e.g. device A in FIG. 7) according to a first embodiment. A radio access controller or management entity 20 interconnects wireless network interface cards 10 and each logical entity via an interconnectivity arrangement, unit, or layer 30. The radio access management entity 20 delivers received frames to a selected one of a plurality of virtual entities STA D to STA F, and may serialize frame transmission requests if multiple logical entities try to transmit at the same time. The device A with the proposed proxy mechanism or functionality may thus incorporate more than one radio device. Each radio device may have its own physical layer (PHY) and link layer (e.g. MAC) channel. Alternatively, two or more radio devices may share a PHY and/or link layer (e.g. MAC) channel.

Additionally, the block diagram of FIG. 8 shows a mesh point functionality MP and a station functionality STA A of the device A, which both can be addressed by the radio access management unit 20 e.g. in dependence on the functionality of the device A.

Figure 9:
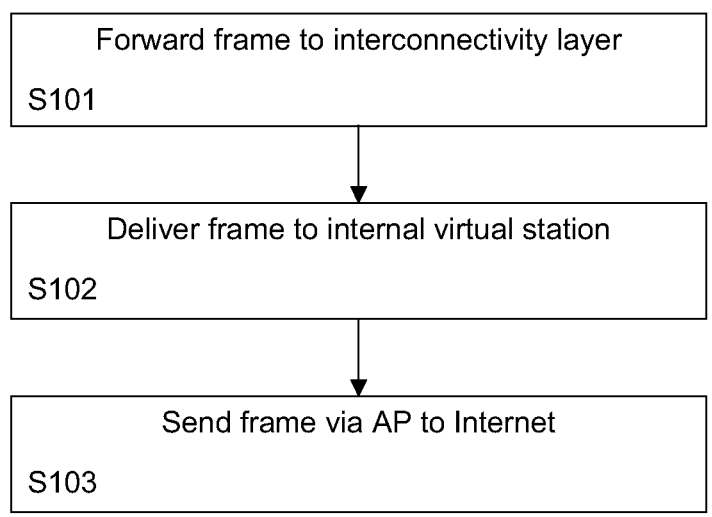
FIG. 9 shows a flow diagram of proxy mechanism according to a second embodiment.

FIG. 9 shows a flow diagram of proxy mechanism according to a second embodiment in a mesh network. This procedure may be implemented as a software routine controlling a processor or controller provided in the radio access management unit 20 of FIG. 8.

The procedure is initiated as soon as a frame is received from the WMN (e.g. one of devices D to G of FIG. 7). The received frame is forwarded to the interconnectivity layer 30 (step S101). Then, based on the source address of the received frame, a corresponding one of the virtual stations STA D to STA G is selected and the frame is delivered to the selected internal virtual station (step S102). Finally, the frame can be sent via the AP to the external network 100 (step S103).

The same procedure can be applied vice versa when a frame is received via the AP from the external network 100. Here, the virtual station can be selected based on the destination address provided in the received frame. From there, the frame can be forwarded based on the destination address to the respective device of the WAN.

Figure 10:
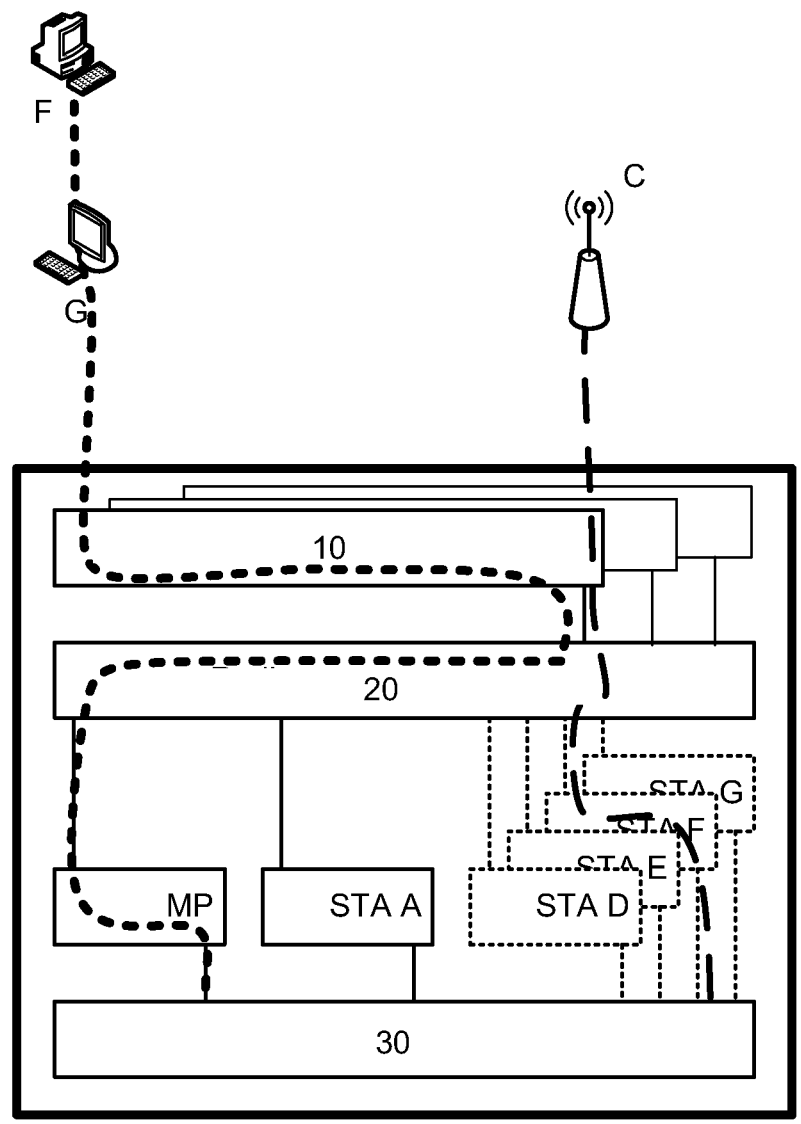
FIG. 10 shows a signaling example based on the block diagram of FIG. 8.

FIG. 10 shows a signaling example based on the block diagram of FIG. 8. Device A connects as mesh point with a WMN by using its internal mesh point functionality MP. Alternatively, the device connects as station with the AP C by using its internal station functionality STA A. For every device or mesh point of the WMN that device A proxies, a virtual station can be established. The virtual stations STA D to STA G connect with the AP C, and thus, appear as being locally in the infrastructure BSS of the AP C. Thus, device A comprises its station functionality STA A as a logical entity that connects with the AP C. This station functionality STA A forms part of AP C's infrastructure BSS. Via the AP C, the station functionality STA A has access to the external network 100, e.g., the Internet.

Furthermore, device A comprises the mesh point functionality MP that connects to the WMN. Device A can instantiate a virtual station for each device of the WMN that device A proxies. The interconnectivity layer 30 interconnects all logical and physical stations, mesh points and other functionality, and thus enables frame forwarding between the different entities and ensures frame delivery to the correct entity.

In the example of FIG. 10, device F needs to access the external network (e.g. Internet). It uses the WMN to reach proxy device A. In the WMN, intermediate devices (e.g. device G) may forward frames to the proxy device A. Having received device F's frame, the proxy device A forwards the frame to its interconnectivity layer 30. The interconnectivity layer 30 delivers the frame to the corresponding virtual station STA F that device A implements on behalf of the device F. Appearing as station F to the AP C, the frame can be sent to the external network. Frames that are received in the reverse direction can be easily forwarded from the proxy device A to the final destination in the WMN. Since the AP C communicates with the virtual stations STA D to STA F at device A, device A can easily detect the correct destination address. Thus, even with a three address format that is used in the AP C's infrastructure BSS, the network connectivity of the AP C to the external network can be provided via the proxy device A to the whole WMN.

In summary, an apparatus and method for connecting a mesh type network via an access device to another network have been described, wherein a proxy mechanism is provided in the mesh type network, that allows for interconnection and range extension of legacy access point based mesh type networks.

It is noted that the present invention is not restricted to the above embodiments and can be used for any network environment which comprises at least one central AP or access device for transmitting to or receiving from a connected network. Moreover, the designation of the entities or functions which provide the proposed proxy mechanism may be different, as long as they fulfill similar functions. The invention works even if there is only one other mesh device besides the one that works as forwarder or proxy device. Thus, even a single wireless access network interface card and a single radio device can be provided in the exemplary proxy device of FIGS. 8 and 10.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality of elements or steps. A single processor or other unit may fulfill the functions of several items recited in the claims. The mere fact that certain measures are recited in mutually different dependent claims does not indicate that a combination of these measures cannot be used to advantage. A computer program used for controlling processor to perform the claimed features may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

The invention claimed is:

1. An apparatus for connecting a mesh type network via an access device to another network, said apparatus operating as a proxy device on behalf at least one actual device present in the mesh type network, the apparatus comprising:
    a) at least one virtual device internally configured within said apparatus, wherein said at least one virtual device corresponds to an associated actual device present in said mesh type network;
    b) an interconnectivity layer configured for receiving frames from devices of said mesh type network and forwarding the received frames to said at least one virtual device internally configured within said apparatus; and
    c) a radio access controller configured to maintain individual connections between said apparatus and said access device, wherein each individual connection is maintained on behalf of said at least one device of said mesh type network via said interconnectivity layer, and wherein said radio access controller is further configured to deliver a signal received from said access device to an addressed virtual device within said apparatus.

2. The apparatus according to claim 1, wherein said radio access controller is configured to serialize transmission requests if multiple virtual devices try to transmit simultaneously.

3. The apparatus according to claim 1, further comprising a wireless access network interface card for providing a connection to said access device, wherein said radio access controller is configured to interconnect said wireless network interface card and logical entities of said apparatus so as to establish said individual connections.

4. The apparatus according to claim 3, wherein at least two of said wireless access network interface cards share at least one physical layer and link layer channel.

5. A method of connecting a mesh type network to another network via an access device and at least one network node having an apparatus operating as a proxy device on behalf at least one other network node in said mesh type network said method comprising:
    a) internally configuring at least one virtual device within said apparatus, wherein said at least one virtual device corresponds to an associated actual device present in said mesh type network;
    b) receiving frames from devices of said mesh type network at an interconnectivity layer of said apparatus, wherein said interconnectivity layer is configured to receive frames from devices of said mesh type network, and
    c) internally forwarding the received frames from said devices of said mesh type network from said interconnectivity layer of said apparatus to said at least one virtual device internally configured within said apparatus; and
    d) maintaining individual connections between said apparatus and said access device by a radio access controller, wherein each individual connection is maintained on behalf of said at least one device of said mesh type network via said interconnectivity layer, and wherein said radio access controller is further configured to deliver a signal received from said access device to an addressed virtual device within said apparatus.

6. A system for connecting a mesh type network via an access device to another network, said system comprising said access device and at least one network node having an apparatus operating as a proxy device on behalf at least one other network node in said mesh type network, the apparatus comprising:
    a) at least one virtual device internally configured within said apparatus, wherein said at least one virtual device corresponds to an associated actual device present in said mesh type network;
    b) an interconnectivity layer configured for receiving frames from devices of said mesh type network and forwarding the received frames to said at least one virtual device internally configured within said apparatus; and
    c) a radio access controller configured to maintain individual connections between said apparatus and said access device, wherein each individual connection is maintained on behalf of said at least one device of said mesh type network via said interconnectivity layer, and wherein said radio access controller is further configured to deliver a signal received from said access device to an addressed virtual device within said apparatus.

7. A non-transitory computer readable medium comprising code means for generating the steps of claim 5 when run on a computer device.

* * * * *